(12) United States Patent
Binsaadoon et al.

(10) Patent No.: US 10,552,671 B2
(45) Date of Patent: Feb. 4, 2020

(54) MULTI-KERNEL FUZZY LOCAL GABOR FEATURE EXTRACTION METHOD FOR AUTOMATIC GAIT RECOGNITION

(71) Applicant: King Fahd University of Petroleum and Minerals, Dhahran (SA)

(72) Inventors: Amer Ghazi Abdullah Binsaadoon, Dhahran (SA); El-Sayed M. El-Alfy, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/821,121

(22) Filed: Nov. 22, 2017

(65) Prior Publication Data
US 2019/0156113 A1    May 23, 2019

(51) Int. Cl.
G06K 9/00     (2006.01)
G06T 7/246    (2017.01)
G06N 20/00    (2019.01)

(52) U.S. Cl.
CPC ......... *G06K 9/00348* (2013.01); *G06N 20/00* (2019.01); *G06T 7/246* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| 8,175,414 | B2* | 5/2012 | Hsu ................. H04N 5/213 348/607 |
| 9,877,668 | B1* | 1/2018 | Sarkar ............. A61B 5/1121 |
| 2004/0258307 | A1* | 12/2004 | Viola ............. G06K 9/00369 382/190 |

(Continued)

FOREIGN PATENT DOCUMENTS

| CN | 102592150 | 6/2013 |
| CN | 103473539 | 7/2015 |

(Continued)

OTHER PUBLICATIONS

Han et al., "Individual recognition using gait energy image," IEEE transactions on pattern analysis and machine intelligence 28, No. 2 (2006): 316-322. (Year: 2006).*

(Continued)

*Primary Examiner* — Feng Niu
(74) *Attorney, Agent, or Firm* — Oblon, McClelland, Maier & Neustadt, L.L.P.

(57) ABSTRACT

Described is a novel method for feature extraction for automatic gait recognition. This method uses Multi-kernel Fuzzy-based Local Gabor Binary Pattern. From a captured gait video sequence, the gait period is determined then a gait energy image is constructed to represent the spatial-temporal variations during one motion cycle of the gait sequence. Then, each gait sequence is represented with a feature vector. The computation of this vector is conducted by first applying the 2D Gabor filter bank then encoding the variations in the Gabor magnitude using a multi-kernel fuzzy local binary pattern operator. Finally, gait classification is performed using a support vector machine.

11 Claims, 9 Drawing Sheets

(56) References Cited

U.S. PATENT DOCUMENTS

| | | | | |
|---|---|---|---|---|
| 2010/0061650 | A1* | 3/2010 | Rai | G06T 5/20 |
| | | | | 382/264 |
| 2013/0332064 | A1* | 12/2013 | Funk | G01C 21/206 |
| | | | | 701/409 |
| 2016/0256078 | A1* | 9/2016 | Sasamoto | A61B 5/7271 |
| 2016/0379074 | A1 | 12/2016 | Nielsen et al. | |

FOREIGN PATENT DOCUMENTS

| | | |
|---|---|---|
| CN | 104061907 | 8/2016 |
| CN | 106934359 | 7/2017 |
| KR | 10-2010-0084066 | 7/2010 |

OTHER PUBLICATIONS

Augusto, "Multiple Kernel Learning for Breast Cancer Classification." (2014). (Year: 2014).*

Liu et al., "Median robust extended local binary pattern for texture classification". IEEE Transactions on Image Processing, 25(3), pp. 1368-1381, Mar. 2016 (Year: 2016).*

Dubey et al., "Local svd based nir face retrieval". Journal of Visual Communication and Image Representation, 49, pp. 141-152, Sep. 2017. (Year: 2017).*

Panda et al., "Dynamic background subtraction using Local Binary Pattern and Histogram of oriented Gradients". In 2015 Third International Conference on Image Information Processing (ICIIP), pp. 306-311, Dec. 2015. (Year: 2015).*

Liao, "Incorporating fuzziness in extended local ternary patterns". In 2012 IEEE International Symposium on Multimedia, pp. 149-152, Dec. 2012. (Year: 2012).*

Gubbi et al., "A novel LBP fuzzy feature extraction method for face recognition". In 2013 Annual IEEE India Conference (INDICON), 5 pages, Dec. 2013. (Year: 2013).*

Huang et al., "Multiple Kernel Fuzzy Clustering", IEEE Trans. on Fuzzy Systems,. vol. 20, No. 1, 120-134, 2012. (Year: 2012).*

Maghsoudi et al., "A computer aided method to detect bleeding, tumor, and disease regions in Wireless Capsule Endoscopy", Signal Processing in Medicine and Biology Symposium, IEEE, Dec. 2016. (Year: 2016).*

Maghsoudi et al., "Detection of Abnormalities in Wireless Capsule Endoscopy Frames using Local Fuzzy Patterns", In Proceeding of 2013 20th International conference on Biomedical Engineering (ICBME), pp. 286-291, Dec. 2013. (Year: 2013).*

Amer G. Binsaadoon et al., "Multi-Kernel Fuzzy-Based Local Gabor Patterns for Gait Recognition," Springer International Publishing, 2016. 10 Pages.

Maodi Hu et al., "Combining Spatial and Temporal Information for Gait Based Gender Classification," 2010 International Conference on Pattern Recognition, 2010. 4 Pages.

Xiaochao Yang et al., "Gait Recognition Based on Dynamic Region Analysis," Signal Processing, vol. 88, 2008. pp. 2350-2356.

Chin Poo Lee et al., "Review on Vision-Based Gait Recognition: Representations, Classification Schemes and Datasets," American Journal of Applied Sciences, vol. 14, No. 2, 2017. 15 Pages.

Amer G. Binsaadoon et al., "Kernel-based Fuzzy Local Binary Pattern for Gait Recognition." Nov. 28, 2016. 52 Pages.

Amer G. Binsaadoon et al., "Kernel-based Fuzzy Local Binary Patern for Gait Recognition," 2016 European Modelling Symposium, 2016. 6 Pages.

Amer G. Binsaadoon et al., "FLGBP: Improved Method for Gait Representation and Recognition," 2016 World Symposium on Computer Applications & Research, 2016. 6 Pages.

* cited by examiner

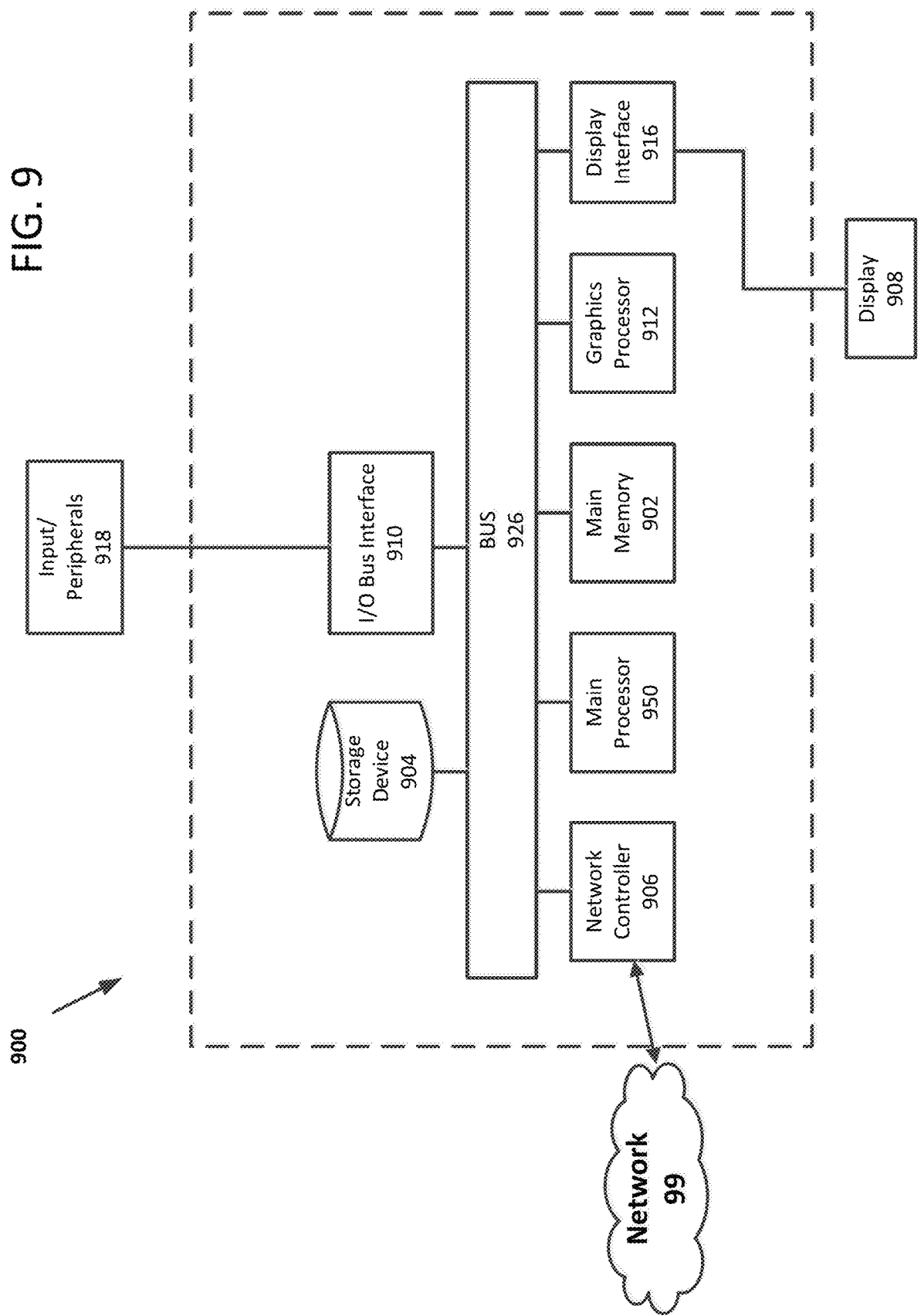

MULTI-KERNEL FUZZY LOCAL GABOR FEATURE EXTRACTION METHOD FOR AUTOMATIC GAIT RECOGNITION

CROSS-REFERENCE TO RELATED PUBLICATIONS

A related publication by the inventors, Binsaadoon A. G., El-Alfy E.-S. M. (2016) Multi-Kernel Fuzzy-Based Local Gabor Patterns for Gait Recognition. In: Bebis G. et al. (eds) Advances in Visual Computing. ISVC 2016. Lecture Notes in Computer Science, vol 10072. Springer, Cham, is incorporated herein by reference in its entirety.

Another partially related publication by the same inventors, Binsaadoon A. G., El-Alfy E.-S. M. Kernel-Based Fuzzy Local Binary Pattern for Gait Recognition. In European Modelling Symposium (EMS), IEEE 2016.

BACKGROUND OF THE INVENTION

Field of the Invention

The present disclosure relates generally to automatic subject recognition (biometrics), and in particular, to an image feature extraction method for gait recognition.

Related Art

Automatic gait recognition is an emerging technology which has recently attracted the attention of researchers in the field of biometrics and pattern recognition. It has several applications in behavioral monitoring, security, public safety and physiotherapy. The term gait refers to the manner in which a person normally walks. The structural and dynamical characteristics of human gait have been found to vary from one person to another which implicates a useful behavioral signature to distinguish the identity of the person. Unlike other biometrics, gait-based systems can effectively operate at a distance (10 meters or more) and with low-resolution video cameras. Gait recognition is non-intrusive in the sense that no cooperation or knowledge of the person under surveillance is required. Gait can also be hard to be disguised or concealed.

However, gait recognition still has several challenges including being affected by intrinsic and extrinsic human factors such as injuries, illness, motion disorder, drunkenness, walking speed variation, age, mood, and fatigue. Among other factors that have impact on the gait-based recognition system performance are environmental conditions such as walking surface, type of shoes, shadows near feet, carried objects, clothing, and weather. See Bouchrika, I., Carter, J. N., Nixon, M. S.: Towards automated visual surveillance using gait for identity recognition and tracking across multiple non-intersecting cameras. Multimedia Tools and Applications 75 (2016) 1201-1221, incorporated herein by reference in its entirety.

One technique for feature extraction, which is widely applied in image processing applications, is Gabor filters. Features in Gabor domain are robust against local distortion and noise and provide a high degree of invariance to intensity, translation, and orientation. See Kamarainen, J. K., Kyrki, V., Kalviainen, H.: Invariance properties of Gabor filter based features-overview and applications. IEEE Transactions on Image Processing 15 (2006) 1088-1099, incorporated herein by reference in its entirety. Gabor features have been applied to some biometric applications such as face and gait recognition. See Liu, C., Wechsler, H.: Gabor feature based classification using the enhanced fisher linear discriminant model for face recognition. IEEE Transactions on Image Processing 11 (2002) 467-476; Hu, M Wang, Y., Zhang, Z., Wang, Y.: Combining spatial and temporal information for gait based gender classification. In: 20th International Conference on Pattern Recognition (ICPR). (2010) 3679-3682; Huang, D. Y., Lin, T. W., Hu, W. C., Cheng, C. H.: Gait recognition based on Gabor wavelets and modified gait energy image for human identification. Journal of Electronic Imaging 22 (2013), each incorporated herein by reference in their entirety. Several methods have been proposed to reduce the high dimensionality of Gabor patterns and generate more effective features.

Another powerful method for feature extraction is Local Binary Pattern (LBP) operator. It has been incorporated with Gabor patterns to encode the variations in magnitude and phase of face images. See Ojala, T., Pietikainen, M., Maenpaa, T.: Multiresolution grayscale and rotation invariant texture classification with local binary patterns. IEEE Transactions on Pattern Analysis and Machine Intelligence 24 (2002) 971-987, incorporated herein by reference in its entirety. Wenchao et al. proposed local Gabor binary pattern (LGBP) descriptors for face recognition. See Zhang, W., Shan, S., Gao, W., Chen, X., Zhang, H.: Local Gabor binary pattern histogram sequence (LGBPHS): a novel non-statistical model for face representation and recognition. In: Tenth IEEE International Conference on Computer Vision (ICCV). Volume 1. (2005) 786-791, incorporated herein by reference in its entirety. Xie et al. proposed local Gabor XOR patterns (LGXP) that utilize local XOR pattern (LXP) operator to encode Gabor phase variations in face images. See Xie, S., Shan, S., Chen, X., Chen, J.: Fusing local patterns of Gabor magnitude and phase for face recognition. IEEE Transactions on Image Processing 19 (2010) 1349-1361, incorporated herein by reference in its entirety.

However, an effective and reliable system for gait extraction has heretofore not been implemented. It is therefore a target of the present disclosure to describe a method and system for effective multi-kernel fuzzy-based local pattern for robust feature extraction and automatic gait recognition.

SUMMARY OF THE INVENTION

Disclosed is an effective multi-kernel fuzzy-based local Gabor binary pattern (KFLGBP) descriptor for robust feature extraction and automatic gait recognition.

In one embodiment the KFLGBP encodes the Gabor magnitude variations using a multi-kernel fuzzy local binary pattern (KFLBP) operator.

In a further embodiment a gait-energy image (GEI) is constructed which captures the spatiotemporal characteristics of a walking person within one gait cycle.

In a further embodiment the GEI image is convolved with a Gabor-filter bank of various scales and different orientations.

In a further embodiment the KFLBP operator is applied on the resulting patterns of the GEI image to encode their magnitude variations.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a block diagram that illustrates a computer system according to an exemplary aspect of the disclosure.

DETAILED DESCRIPTION

Figure 1:
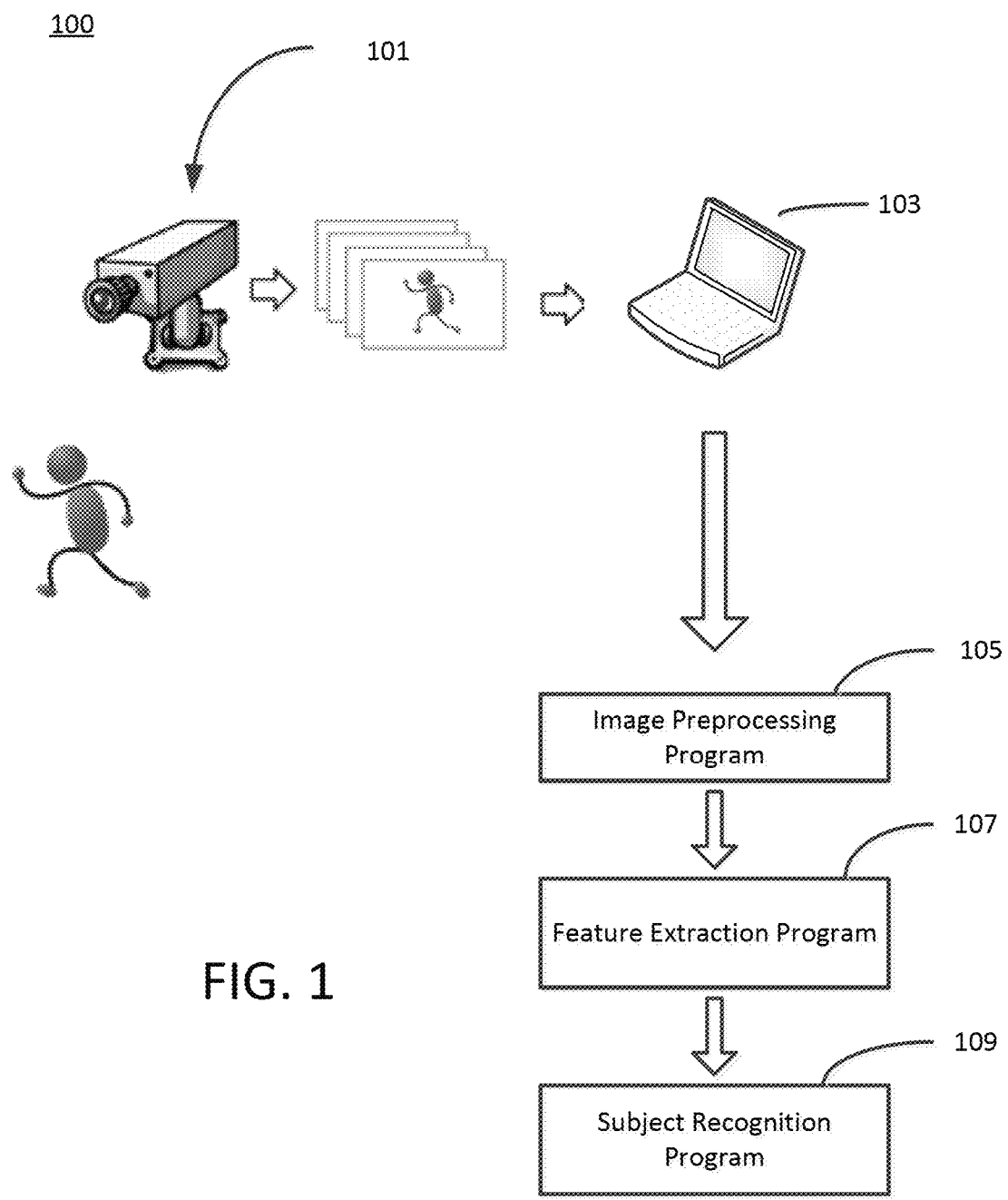
FIG. 1 is a block diagram that shows a system for feature extraction and automatic gait recognition according to an exemplary aspect of the disclosure.

Referring now to the drawings, wherein like reference numerals designate identical or corresponding parts throughout several views, the following description relates to automatic gait recognition, and in particular to a method of feature extraction from video images that have been obtained at a distance (e.g., 10 meters or more) and with low resolution video cameras. The method alleviates gray-level variations due to noise and illumination change and thereby improves discrimination ability.

FIG. 1 is a block diagram that shows a system for feature extraction and automatic gait recognition according to an exemplary aspect of the disclosure. The system includes a video camera 101 for capturing gait sequence of a subject. The captured video includes a sequence of frames that show a subject, such as a person, in motion. In an exemplary aspect, the video signal is an analog or a digital signal that has been captured using an analog video camera (such as an analog CCTV surveillance camera) or a digital video camera (such as a network-based CCTV security camera) that may be mounted in a place of business. A typical security camera that records to VHS would have a resolution of 333×480. Generally, an analog video may range in resolution from about 333×480 to 768×576. However, a black and white video of an exemplary aspect of the disclosure may have much lower resolution, such as 120×120. In another exemplary aspect, the video camera may be held by a user or may be attached to a tripod. In an exemplary aspect, the video may be a video clip captured with a digital camera that has a short-duration video capture function.

A captured video image may be transferred to a computer system 103. It should be understood that any approach for transferring images between a camera device and a computer system may be used, and may include wired or wireless communications. In an exemplary aspect, the video camera and computer system may be contained in a single device, such as a smartphone, tablet, or laptop computer equipped with one or more built-in cameras. In an exemplary aspect, the computer system may be any of a variety of computer systems, ranging from a smartphone to desktop computer. In an exemplary aspect, the computer system may include a display device that can display a captured video as well as individual or sequence of video frames in various stages of image processing. FIG. 1 shows by way of example, a laptop computer. The computer system 103 includes one or more processors for executing the image processing programs of the present disclosure, as well as at least a local memory for storing the programs while they are being executed. In one embodiment, the image processing programs, by way of example, may include an image preprocessing program 105, a feature extraction program 107, and a subject recognition program 109. The term program can relate to program code contained in one or more files, and may be a single sequential set of instructions or separate program modules.

In an exemplary aspect, the image preprocessing program 105 uses silhouettes of the subject and subtracts the background of the silhouettes in frames that are to be used for feature extraction. The image processing program 105 segments and tracks the moving subject's silhouettes, estimates a gait period and computes the gait energy image (GEI). The gait period, which will be discussed further below, is a gait cycle of a certain gait sequence. The gait energy image captures the spatiotemporal characteristics of a walking person.

The feature extraction program 107 takes the GEI and generates a feature vector by convolution of the GEI with a Gabor filter bank to produce a more robust gait representation. In one embodiment, the convolution operation uses a Gabor filter bank having five different scales and eight different orientations to provide forty filtered response images. It should be understood that various other scales and orientations may be used to vary the amount of robustness desired in feature extraction. Orientation refers to features that may be extracted at different angles between 0 and 180. Thus, the number of orientations is the division of this range into equal parts. Any number that divides this range into equal parts may be used. However, there may be a limit in the extracted features in the case of black and white silhouettes. Scale refers to image scale. In a typical example, a grayscale image may be filtered at 16 scales. However, again, there may be a limit as to the amount of information that may be obtained by increasing scale. The subject recognition program 109 may include a support vector machine for classification. In an exemplary aspect, the support vector machine for classification takes the feature vectors as training examples to build a model for classifying new examples. It should be understood that other approaches for supervised learning may be used to build a classification model based on the feature vectors. In one embodiment, the resulting model may be used in an application to predict the identity of a moving person in probe videos. In other embodiments, a model may be constructed for applications such as behavioral monitoring or physiotherapy.

In one embodiment, the feature extraction program 107 applies a multi-kernel fuzzy binary pattern operator to encode the magnitude variations of the Gabor filters outputs. As noted above, a Local Binary Pattern (LBP) operator may be incorporated with Gabor patterns to encode the variations in magnitude and phase of a Gabor filtered image. A histogram is constructed that represents a feature vector. As an alternative, a FLBP operator may be used to incorporate fuzzy logic rules into the LBP operator. The FLBP operator includes a histogram that has no zero-valued bins, and as such, is more informative than a LBP histogram which may have bins of zero value. In an exemplary aspect, the FLBP operator is further expanded to increase its robustness to gray-level variations due to noise and illumination change and improve its discrimination ability.

In particular, the LBP operator describes the relationships between a central pixel, $p_c$, and its p surrounding pixels which are equally spaced around the center pixel at radius, r. The coordinates of the p neighbor pixels are located at (r sin($2\pi n/p$), r cos($2\pi n/p$)). Interpolation is applied when coordinates do not fit in the exact center of pixels. Neighbor pixels with values greater than or equal to the central pixel will produce binary 1, otherwise 0. Then, the binaries are scanned sequentially in a clockwise manner to form a micropattern which is utilized to characterize the textural properties of an image I. The LBP operator is defined as follows:

$$LBP(p, r) = \sum_{n=0}^{p-1} s(p_n - p_c)2^n$$

where s(x)=1 if x≥0 and s(x)=0 otherwise. A histogram h of length $N=2^p$ is then constructed to describe the distribution of the generated patterns of the whole image I.

The FLBP operator incorporates fuzzy logic rules into the conventional LBP operator. See Iakovidis, D., Keramidas, E., Maroulis, D.: Fuzzy local binary patterns for ultrasound texture characterization. In: Image Analysis and Recognition. Volume 5112. Springer Berlin Heidelberg (2008) 750-759, incorporated herein by reference in its entirety. Fuzzy logic, as opposed to binary, may involve a range of values, such as between zero and one, hence the term fuzzy. The range of values may be determined based on a membership function. The FLBP operator measures the degree of certainty that a neighbor $p_n$ is greater or smaller than a central pixel $p_c$. This is achieved by using two membership functions $m_1$ and $m_0$, where $m_1$ measures the degree to which a neighbor pixel $p_n$ as a greater value than $p_c$ and is defined by:

$$m_1(n) = \begin{cases} 1 & p_n \geq p_c + T \\ \frac{T + p_n - p_c}{2 \cdot T} & p_c - T < p_n < p_c + T \\ 0 & p_n \leq p_c - T \end{cases}$$

Similarly, $m_0$ measures the degree to which a neighbor pixel $p_n$ has a smaller value than $p_c$ and is defined by:

$$m_0(n) = \begin{cases} 0 & p_n \geq p_c + T \\ \frac{T - p_n + p_c}{2 \cdot T} & p_c - T < p_n < p_c + T \\ 1 & p_n \leq p_c - T \end{cases}$$

where T is a threshold parameter that controls the level of fuzziness. In one embodiment, the value of T may be set as T=5. It is understood that other threshold values are possible.

Subsequently, FLBP can generate more than one LBP code for the central pixel $p_c$. In other words, fuzzy values enables contribution of more than a single bin in the distribution of the LBP values used as a feature vector. The membership functions $m_1$ and $m_0$ are used to determine the contribution of each LBP code to a single bin of the FLBP histogram as follows:

$$C(LBP) = \prod_{n=0}^{p-1} m_{s_n}(n)$$

where $s_n \in \{0, 1\}$. The total contribution of all LBP codes is equal to the unity as follows:

$$\sum_{LBP=0}^{2^p-1} C(LBP) = 1$$

Figure 2:
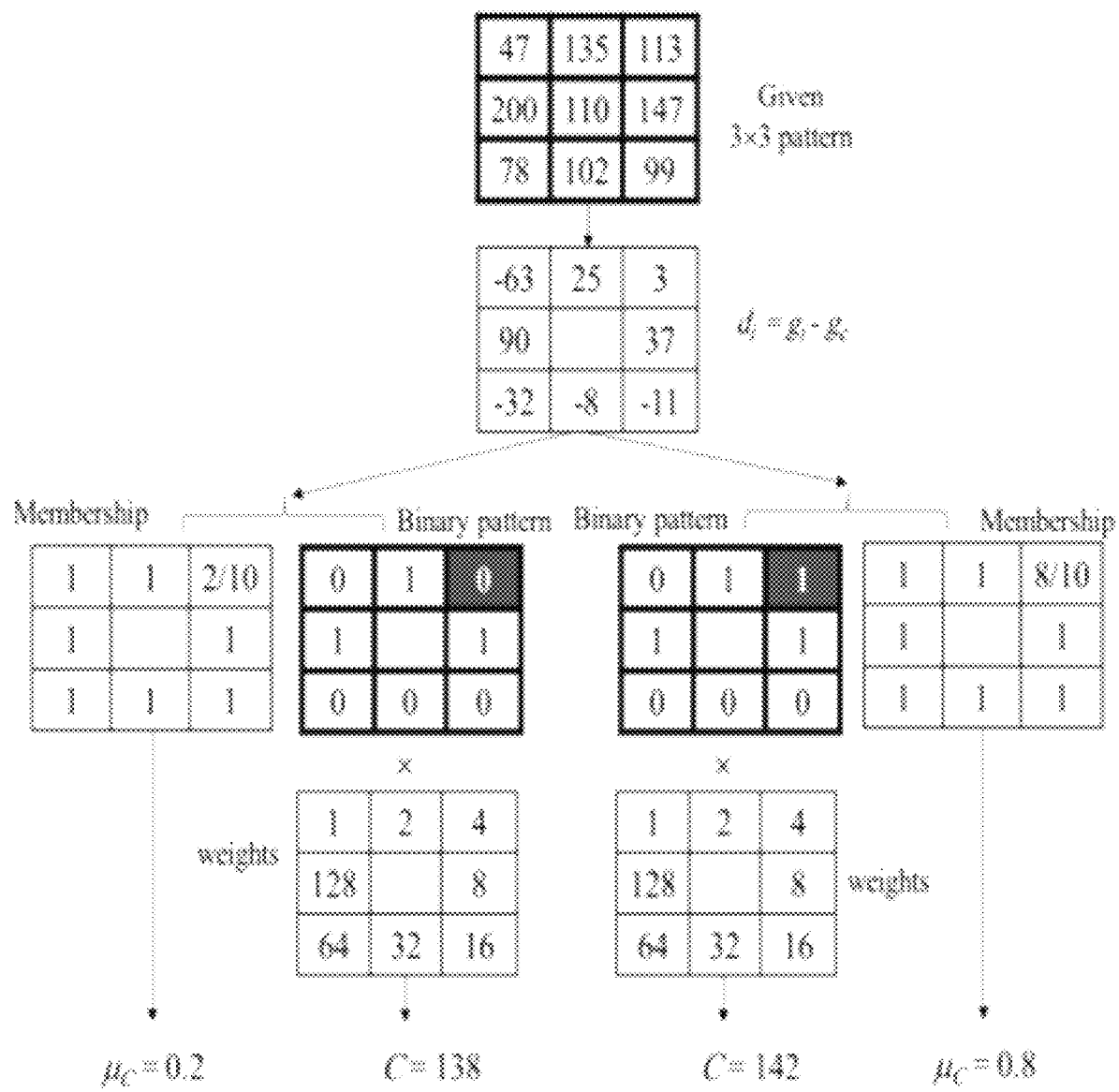
FIG. 2 is a schematic that illustrates an example of computing FLBP codes and membership functions.

FIG. 2 shows an example of computing FLBP codes and associated membership values using 3×3 pixel neighborhood representing a local feature around a central pixel.

The FLBP histogram h that results from application of the FLBP operator represents a feature vector. The feature vector describes the distribution of LBP binary codes of an image. The FLBP histogram has no zero-valued bins and, subsequently, the feature vectors are more informative than the conventional LBP histogram which may have bins of zero value.

Figure 3:
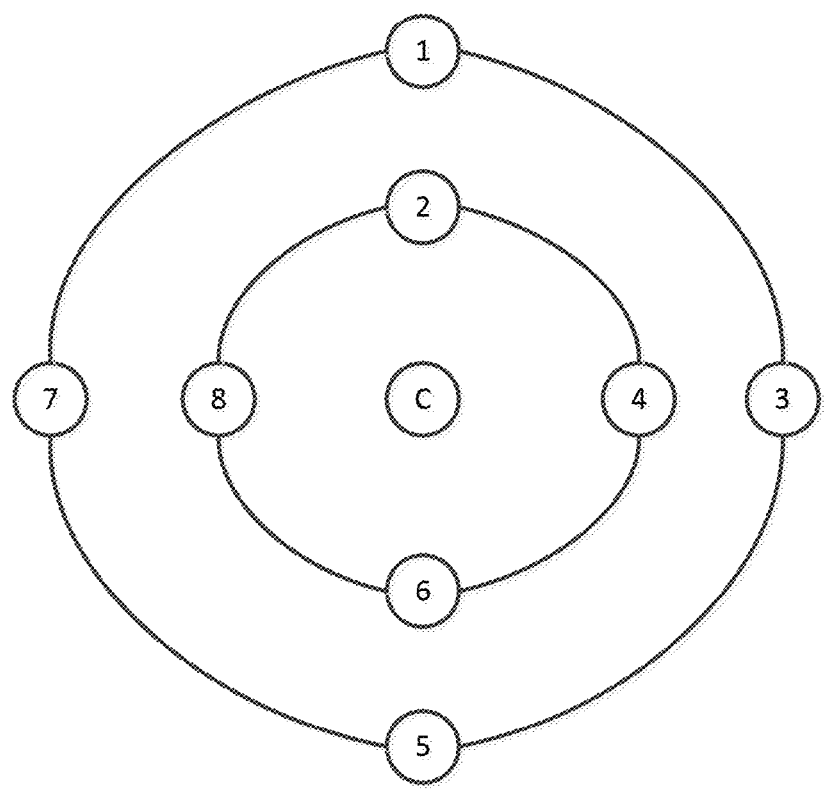
FIG. 3 is a schematic that illustrates an example of KFLBP scheme with K=2, $p_{r1}=p_{r2}=4$.

In one embodiment, feature vectors are determined with a multi-kernel FLBP (FLBP) operator by utilizing more than one radius r. Surrounding pixels are sampled over K radii (kernels). It is not necessary to have the same neighbors p for each radius r. Then, the information provided by multiple FLBP operators is combined to form the final binary code. This approach of using information from multiple FLBP operators alleviates the effect of noise due to changes in the gray-level intensities as well as illumination variations. FIG. 3 illustrates an example of using two kernels and four sampling points for each kernel. Node numbers indicate the sequence of bits that form the final binary code.

Video images of walking persons that have been captured from a distance and with low-resolution cameras have a great deal of variations in illumination and noise from changes in intensities. Applying multiple FLBP operators particularly leads to capturing more important structural and statistical gait information.

In contrast to FLBP, KFLBP has the same formulation with the difference of having multiple FLBP operators fused together. Each kernel has a separate operator with the same or different number of neighbors $p_{rk}$.

$$KFLBP_{p_{r_k}, r_k} = \sum_{n=0}^{p_{r_k}-1} s(p_n^{r_k} - p_c)2^n$$

where $p_{rk}$ is the number of neighbors at radius $r_k$; $p_c$ is the center pixel; $p_n^{rk}$ is the $n^{th}$ neighbor pixel at radius $r_k$.

The outputs of each operator are then combined together to form the final binary code. Without loss of generality and for simplicity, in an exemplary aspect values of K=2 and $p_{r1}=p_{r2}=4$ may be used. In one embodiment, there may be two FLBP operators at two different radii $r_1=1$ and $r_2=2$ as follows:

$$KFLBP_{p_{r_1}, r_1}^{K=2} = \sum_{n=0}^{p_{r_1}-1} s(p_n^{r_1} - p_c)2^n$$

$$KFLBP_{p_{r_2},r_2}^{K=2} = \sum_{n=0}^{p_{r_2}-1} s(p_n^{r_2} - p_c)2^n$$

Although KFLBP preserves a lot of structural and statistical information by combining information from different kernels, the KFLBP histogram h size is not increased over that of the conventional FLBP and LBP histograms.

Figure 4:
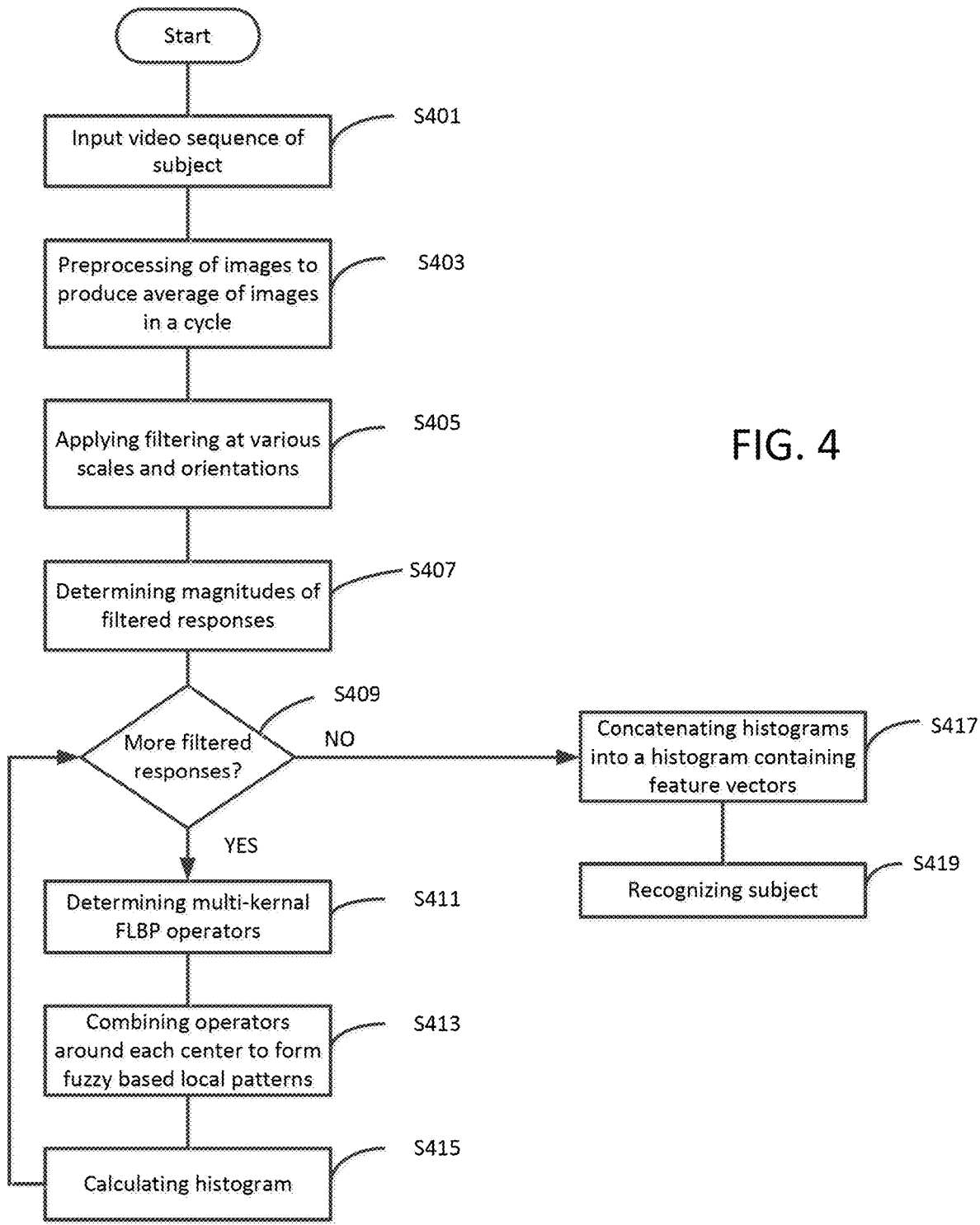
FIG. 4 is a flowchart that shows a method for automatic gait recognition according to an exemplary aspect of the disclosure.

FIG. 4 is a flowchart that shows a method for automatic gait recognition according to an exemplary aspect of the disclosure. In order to perform gait recognition, a video of a walking person is captured and, in S401, is input to the computer system. In an exemplary aspect, in S403, the captured images are preprocessed to construct a Gabor-energy image (GEI). For purposes of robustness, Gabor filtering may be applied to the GEI to obtain Gabor-based gait responses. KFLBP operators are determined and applied to obtain KFLGBP descriptors that encode variations in the magnitude of responses to the Garbor filtering. In an exemplary aspect, the number of responses is based on the number of scales and the number of orientations in the Gabor filter.

Figure 5:
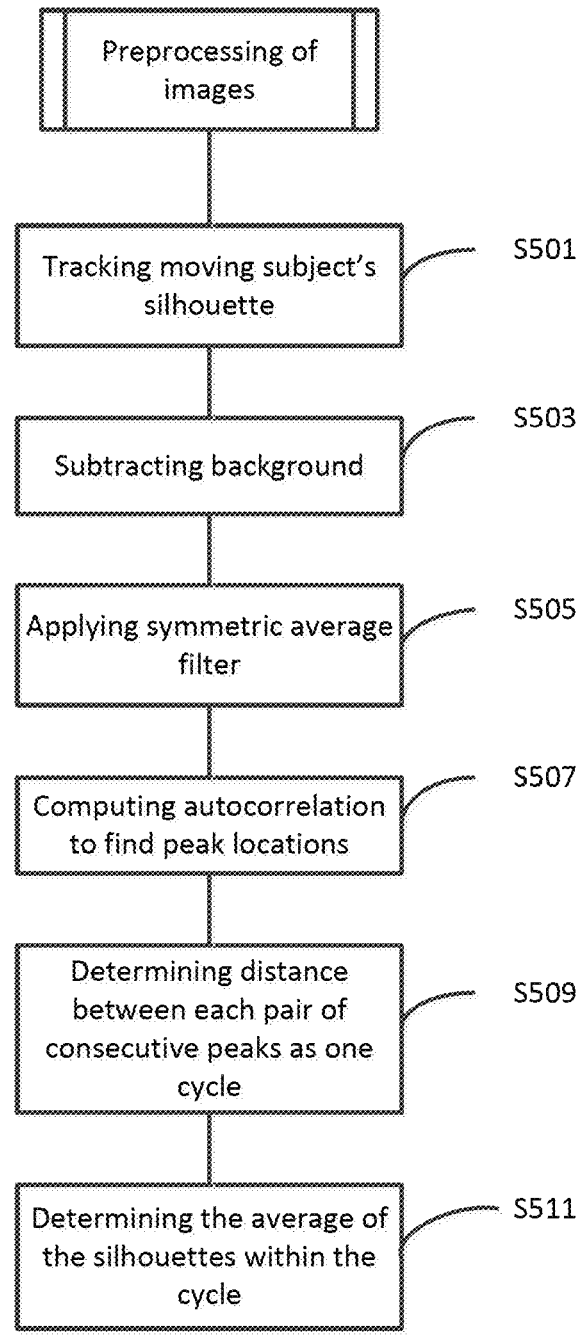
FIG. 5 is a flowchart that shows preprocessing that is performed in the method of FIG. 4.

As mentioned above, the GEI image captures the spatial temporal characteristics of a walking person. To construct the GEI image, an input gait sequence of binary silhouettes may be analyzed to detect the gait cycle by Wang's algorithm (see Wang et al. See Wang, L., Tan, T., Ning, H., Hu, W.: Silhouette analysis-based gait recognition for human identification. IEEE Transactions on Pattern Analysis and Machine Intelligence 25 (2003) 1505-1518, incorporated herein by reference in its entirety). FIG. 5 is a flowchart that shows preprocessing that is performed in the method of FIG. 4 to construct a Gabor-energy image (GEI). In S501, the 2D dimensional aspect ratio of the moving subject's silhouette bounding box is determined in selected image frames and tracked over time. In S503, the background component is then canceled out by subtracting and dividing the aspect ratio mean and standard deviation, respectively. In S505, a symmetric average filter is then applied to smooth the signal. In S507, an autocorrelation operation is performed to find peak locations by using the first-order derivative of an autocorrelated signal. For purposes of this disclosure, a gait cycle of a certain gait sequence constitutes a gait period. In S509, an average of the distance between each pair of consecutive peaks is determined, and set as the gait period.

Figure 6:
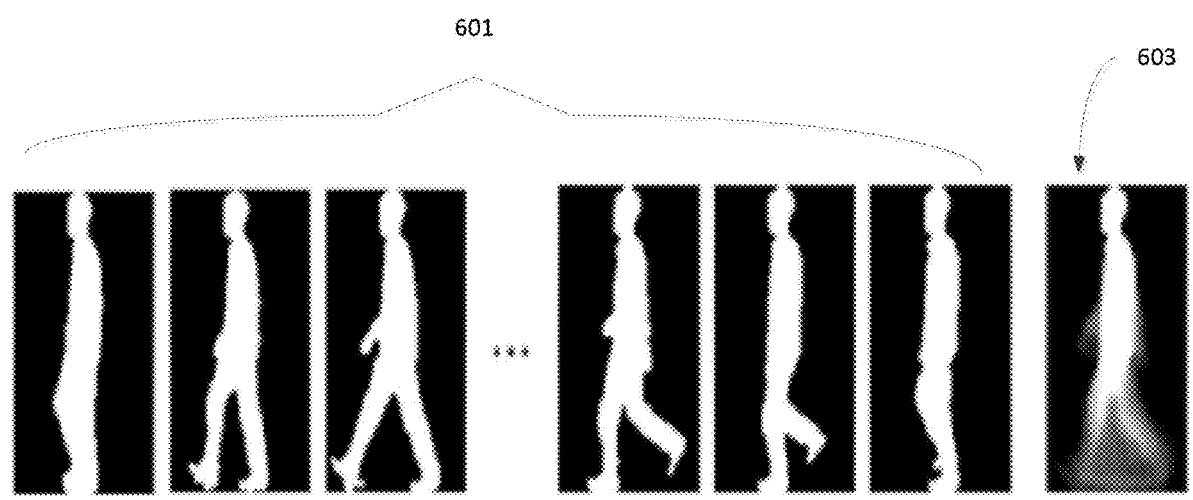
FIG. 6 are an example sequence of images that illustrates an example of GEI construction according to an exemplary aspect of the disclosure.

Given the gait period, in S511, the GEI image is constructed as the average of the binary silhouettes within that period. In an exemplary aspect, due to the variations in camera view and depth, each silhouette is first binarized, normalized, e.g., into 240×240, and finally aligned. The GEI image is created as follows:

$$G(x, y) = \frac{1}{M} \sum_{t=1}^{M} B_t(x, y); \forall x, y$$

where M is the number of silhouettes within one gait period and $B_t(x, y)$ is the binary silhouette at time t within the period. FIG. 6 shows an example of a gait sequence 601 and a computed GEI image 603.

Referring again to FIG. 4, in S405, the GEI image is convolved with a Gabor filter bank to get a more robust Gabor-based gait representation. In one embodiment, the Gabor filter bank may have five different scales and eight different orientations. In this example, the number of responses to the Gabor filtering is 40 (for five scales and eight orientations). However, it should be understood that the number of scales and orientations may be other values depending on computation time and desired results. The output of the convolution is given by the following equation:

$$G_{v,\mu}(x,y) = G(x,y) * \psi_{v,\mu}(x,y)$$

where * represents convolution, $\psi_{v,\mu}(x, y)$ is a 2D Gabor wavelet kernel function at orientation $\mu=0, 1, 2, \ldots, 7$ and scale $v=0, 1, 2, 3, 4$; $G(x, y)$ is the gait-energy image; and $G_{v,\mu}(x,y)$ represents the convolution output. See Lades, M., Vorbruggen, J., Buhmann, J., Lange, J., von der Malsburg, C., Wurtz, R., Konen, W.: Distortion invariant object recognition in the dynamic link architecture. IEEE Transactions on Computers 42 (1993) 300-311, incorporated herein by reference in its entirety. The kernel is defined by:

$$\psi_{v,\mu}(z) = \frac{\|k_{v,\mu}\|^2}{\sigma^2} e^{-(\|k_{v,\mu}\|^2\|z\|^2/2\sigma^2)} \left[ e^{ik_{v,\mu}z} - e^{-\sigma^2/2} \right]$$

where $z=(x, y)$, $\|\bullet\|$ is the Euclidean norm operator, $k_{v,\mu}=k_v e^{i\varphi_\mu}$ with $k_v=k_{max}/\lambda^v$, $\lambda=1.2$ is the spacing factor between Gabor wavelets in the frequency domain, $\phi_\mu=\pi\mu/8$ is the orientation where $\mu=0, 1, 2, \ldots, 7$, and $k_{max}=0.35$. Each Gabor filter response contains two main parts: real part, $R_{v,\mu}(x,y)$ and imaginary part, $Im_{v,\mu}(x,y)$. In one embodiment, the magnitude of the Gabor filtering is used as the Gabor filtering response. In other embodiments, other parameters of the Gabor filtering may be used as the Gabor filtering response, such as the real part itself. In the example embodiment, in S407, the magnitude of the Gabor filtering is generated as follows:

$$Mag_{v,\mu}(x,y) = \sqrt{R_{v,\mu}^2(x,y) + Im_{v,\mu}^2(x,y)}$$

Figure 7:
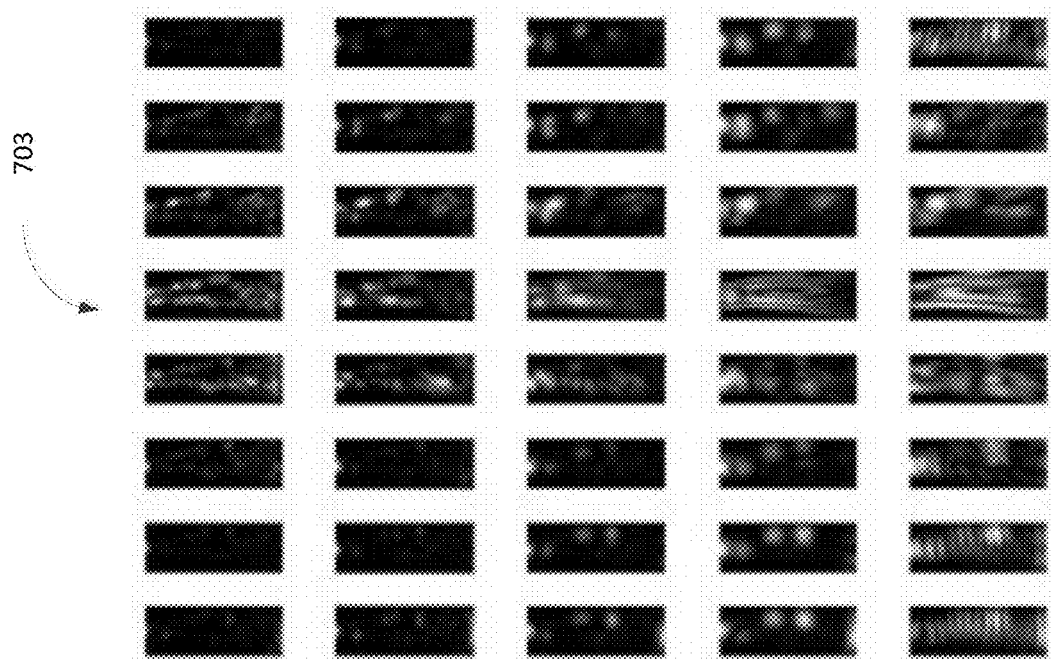
FIG. 7 illustrate an original GEI and a GEI Gabor convolution using filter bank of 5 scales and 8 orientations according to an exemplary aspect of the disclosure.
Figure 7:
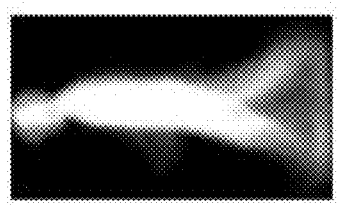
Figure 8:
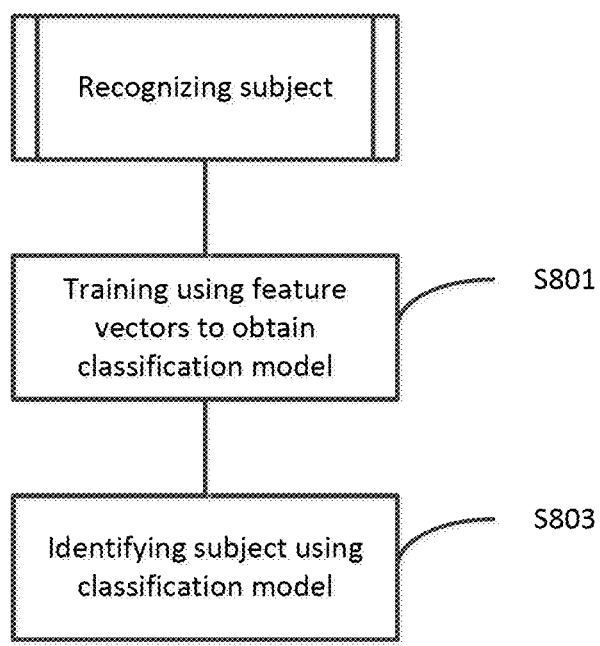
FIG. 8 is a flowchart that shows recognizing processing that is performed in the method of FIG. 4.

FIG. 7 shows an example of applying a Gabor filter on one GEI 701 to obtain Gabor filter responses 703.

Once the convolution process is completed, KFLGBP descriptors are determined that encode the variations in the magnitude of Gabor filter responses. In one embodiment, in S409, fuzzy-based local Gabor patterns may be determined for each Gabor response. The KFLGBP descriptors are determined by first applying the above described KFLBP operator.

In an exemplary aspect, the KFLBP operator may be applied on the magnitude of Gabor response to generate the fuzzy-based local Gabor patterns as follows:

$$KFLBP_{v,\mu}(p_{r_k}, r_k) = \sum_{n=0}^{p_{r_k}-1} s(Mag_{v,\mu}(p_n^{r_k}) - Mag_{v,\mu}(p_c))2^n$$

where $p_{r_k}$ is the number of neighbors at radius $r_k$; $p_c$ is the center pixel; $p_n^{r_k}$ is the $n^{th}$ neighbor pixel at radius $r_k$.

In particular, the outputs of each operator are combined together to form the final fuzzy-based local Gabor patterns. In one embodiment, values of K=2 and $p_{r_1}=p_{r_2}=4$ are used. In the example embodiment, in S411, two KFLBP operators at two different radii $r_1$, and $r_2$ are as follows:

$$KFLBP_{v,\mu}(p_{r_1}, r_1) = \sum_{n=0}^{p_{r_1}-1} s(Mag_{v,\mu}(p_n^{r_1}) - Mag_{v,\mu}(p_c))2^n$$

-continued $$KFLBP_{v,\mu}(p_{r_2}, r_2) = \sum_{n=0}^{P_{r_2}-1} s(Mag_{v,\mu}(p_n^{r_2}) - Mag_{v,\mu}(p_c))2^n$$

For each filtered response, a binary value $KFLGBP_{v,\mu}^n$ is calculated as follows:

$$KFLGBP_{v,\mu}^n = KFLBP(Mag_{v,\mu}(p_c), Mag_{v,\mu}(p_n))$$

where $Mag_{v,\mu}(p_n)$ denotes the magnitude of Gabor response with scale v and orientation µ, and $p_n$ is the $n^{th}$ neighbor pixel.

In S413, the outputs of each operator are combined together to form the final Fuzzy-based local Gabor patterns, for each filtered response at scale v and orientation µ as follows:

$$KFLGBP_{v,\mu}(p_c) = \sum_{n=0}^{p-1} KFLGBP_{v,\mu}^n \cdot 2^n$$

where $p_c$ denotes the central pixel, p is the number of neighbor pixels around $p_c$.

Based on the defined KFLGBP patterns, in S415, one pattern histogram is calculated from each Gabor filter response and then, in S417, all histograms under all scales and orientations (e.g., 40 combinations in our setup) are finally concatenated into a histogram containing the KFLGBP descriptors of the GEI gait image, as extracted feature vectors.

In S419, in one embodiment the extracted feature vectors are used as input to a support vector machine to build a classification model. The resulting model may be used to predict the identity of a moving person in videos. In alternative embodiments, other machine learning algorithms, such as neural networks and Hidden Markov model may be trained as a classifier.

Examples

The CASIA B gait database was used to carry out all experiments. See Yu, S., Tan, D., Tan, T.: A framework for evaluating the effect of view angle, clothing and carrying condition on gait recognition. In: Proc. 18th International Conference on Pattern Recognition (ICPR). Volume 4. (2006) 441-444, incorporated herein by reference in its entirety. It includes 13,640 gait sequences samples among 124 subjects (93 males and 31 females). During the dataset collection, the creators have used 11 cameras to record sequences from 11 different viewing angles. Each subject has 110 video sequences generated from walking 10 times through a straight line of concrete ground as follows: 6 for normal walking, 2 while wearing a coat, and 2 while carrying a bag. Thus, the database contains 110×124=13,640 total sequences for all subjects. A setup was used similar to that of the authors of CASIA B database. One gallery set of normal walking of all subjects is used to train the SVM model and the three sets under different covariates are used as the probe sets: Probe Set A where subjects are normally walking, Probe Set B where subjects are carrying bags, and Probe Set C where subjects are wearing coats.

The correct classification rate (CCR) represents the performance at rank-1, which indicates that the probe sample is matching with the only one returned candidate. Eq. 18 represents the CCR percentage:

$$CCR(\%) = \frac{s_c}{s_t} * 100$$

where $s_c$ is the number of correctly identified subjects; $s_t$ is the total number of tested subjects. The closed-set identification strategy was adapted which guarantees the existence of the unknown subject within the database gallery.

The performance of the proposed KFLGBP was analyzed on different walking covariates in the database in terms of CCR. The performance was compared with several other gait recognition methods. Some methods have been applied on silhouette images in the original papers but they have been reimplemented and applied on GEI images such as pyramid of Histogram of Gradient (pHOG). See Yang, G., Yin, Y., Park, J., Man, H.: Human gait recognition by pyramid of HOG feature on silhouette images. Proc. SPIE Optical Pattern Recognition 8748 (2013) 87480J-87480J-6, incorporated herein by reference in its entirety. Tables 1 to 3 report the experimental results on CASIA B using CCR measure under normal walking, walking with bags, and walking with coats covariates, respectively. Comparing to several other methods, KFLGBP is mostly outperforming them under various viewing angles. It is obvious from the reported results that normal walking covariate achieves the best results over carrying-bag and wearing-coat covariates. This can be attributed to the level of deformation caused by the coat or the bag which cause difficulties in capturing the basic discriminative features originated from the normal walking. The performance under carrying bag is moderate because the bag is occupying a region in the middle of the human body causing deformity for that part of body during walking. However, coat causes the largest amount of deformity to the human body. Consequently, wearing a coat covariate is the most difficult scenario to discover and extract representative features for all tested methods.

TABLE 1

Evaluation and comparison of KFLBP and KFLGBP with other methods under Normal-Walking covariate

| Method | CCR(%) | | | | | | | | | | |
|---|---|---|---|---|---|---|---|---|---|---|---|
| | 0° | 18° | 36° | 54° | 72° | 90° | 108° | 126° | 144° | 162° | 180° |
| GEI [9] | 89.11 | 87.5 | 85.08 | 82.25 | 87.9 | 89.11 | 88.3 | 85.88 | 83.87 | 83.46 | 89.11 |
| GEI + pHOG [14] | 82.76 | 74.57 | 76.72 | 76.72 | 81.47 | 86.21 | 81.04 | 77.59 | 76.72 | 78.45 | 83.62 |
| GEI + PCA [15] | 83.06 | 73.38 | 75 | 72.58 | 85.08 | 84.67 | 83.46 | 83.06 | 77.41 | 75.8 | 87.09 |
| GEI + LXP [16] | 61.64 | 61.21 | 53.02 | 56.04 | 60.78 | 62.07 | 63.36 | 57.33 | 57.33 | 63.79 | 53.02 |
| GEI + LBP [17] | 56.9 | 66.81 | 60.35 | 56.9 | 68.54 | 73.28 | 68.97 | 62.5 | 61.21 | 68.97 | 57.33 |
| GEI + SLBP [18] | 68.54 | 65.52 | 61.21 | 63.79 | 68.54 | 68.97 | 65.52 | 68.54 | 66.81 | 75.43 | 66.38 |
| GEI + FLBP | 74.14 | 78.45 | 67.24 | 74.14 | 75.43 | 78.02 | 76.29 | 75.86 | 75 | 77.59 | 70.69 |
| GEI + KFLBP | 89.66 | 92.24 | 82.33 | 82.76 | 90.95 | 88.79 | 87.93 | 87.07 | 85.35 | 91.38 | 82.76 |

TABLE 1-continued

Evaluation and comparison of KFLBP and KFLGBP with other methods under Normal-Walking covariate

| Method | CCR(%) | | | | | | | | | | |
|---|---|---|---|---|---|---|---|---|---|---|---|
| | 0° | 18° | 36° | 54° | 72° | 90° | 108° | 126° | 144° | 162° | 180° |
| LGBP [7] | 88.31 | 80.65 | 78.23 | 77.42 | 83.87 | 85.08 | 87.5 | 87.09 | 81.45 | 83.47 | 86.29 |
| LGXP [8] | 88.71 | 79.84 | 77.02 | 77.82 | 83.87 | 83.47 | 86.29 | 87.09 | 81.85 | 84.27 | 87.9 |
| SLGBP | 85.08 | 77.82 | 77.82 | 79.44 | 83.87 | 85.89 | 85.48 | 85.48 | 81.05 | 84.27 | 83.87 |
| FLGBP | 90.52 | 88.31 | 84.91 | 87.93 | 88.79 | 87.93 | 92.24 | 90.09 | 87.5 | 86.64 | 89.66 |
| KFLGBP | 94.4 | 93.54 | 92.67 | 93.54 | 93.1 | 95.69 | 96.12 | 94.4 | 92.67 | 93.54 | 95.69 |

TABLE 2

Evaluation and comparison of KFLBP and KFLGBP with other methods under Carrying-Bag covariate

| Method | CCR(%) | | | | | | | | | | |
|---|---|---|---|---|---|---|---|---|---|---|---|
| | 0° | 18° | 36° | 54° | 72° | 90° | 108° | 126° | 144° | 162° | 180° |
| GEI [9] | 50.8 | 42.74 | 45.56 | 41.53 | 45.16 | 41.12 | 41.12 | 37.5 | 40.72 | 46.37 | 51.2 |
| GEI + pHOG [14] | 45.26 | 30.6 | 30.6 | 24.57 | 20.26 | 22.41 | 18.54 | 21.98 | 20.26 | 35.78 | 42.67 |
| GEI + PCA [15] | 40.32 | 35.48 | 35.88 | 30.64 | 37.5 | 33.46 | 39.51 | 33.06 | 29.83 | 34.67 | 41.93 |
| GEI + LXP [16] | 26.72 | 18.54 | 15.95 | 15.95 | 9.91 | 18.54 | 18.1 | 18.1 | 8.62 | 21.55 | 20.69 |
| GEI + LBP [17] | 28.02 | 43.1 | 34.05 | 30.6 | 34.05 | 37.5 | 34.48 | 31.47 | 28.02 | 35.35 | 29.74 |
| GEI + SLBP [18] | 28.45 | 28.88 | 23.71 | 25 | 29.74 | 35.78 | 31.04 | 26.72 | 31.9 | 27.16 | 28.45 |
| GEI + FLBP | 40.85 | 43.54 | 36.91 | 33.62 | 36.72 | 40.1 | 38.9 | 31.16 | 30.16 | 40.55 | 37.35 |
| GEI + KFLBP | 55.17 | 53.45 | 40.09 | 37.93 | 40.52 | 42.24 | 42.67 | 31.04 | 33.62 | 46.98 | 51.72 |
| LGBP [7] | 50 | 34.68 | 36.29 | 33.87 | 33.87 | 34.68 | 33.06 | 34.68 | 41.94 | 43.95 | 48.39 |
| LGXP [8] | 48.39 | 33.87 | 34.68 | 35.48 | 29.84 | 31.45 | 31.85 | 35.48 | 39.92 | 42.74 | 47.18 |
| SLGBP | 44.35 | 29.44 | 28.23 | 24.59 | 29.03 | 30.24 | 26.61 | 31.05 | 32.66 | 33.06 | 41.53 |
| FLGBP | 54.74 | 46.55 | 42.74 | 38.79 | 49.57 | 53.45 | 46.12 | 40.95 | 38.79 | 48.71 | 46.55 |
| KFLGBP | 62.07 | 51.72 | 55.17 | 46.12 | 52.16 | 53.45 | 48.71 | 53.45 | 55.17 | 62.07 | 64.45 |

TABLE 3

Evaluation and comparison of KFLBP and KFLGBP with other methods under Wearing-Coat covariate

| Method | CCR(%) | | | | | | | | | | |
|---|---|---|---|---|---|---|---|---|---|---|---|
| | 0° | 18° | 36° | 54° | 72° | 90° | 108° | 126° | 144° | 162° | 180° |
| GEI [9] | 22.98 | 20.07 | 20.07 | 15.32 | 10.88 | 16.12 | 13.7 | 16.12 | 23.79 | 22.98 | 23.38 |
| GEI + pHOG [14] | 12.93 | 13.79 | 12.07 | 9.05 | 9.48 | 8.19 | 9.48 | 10.78 | 11.21 | 13.79 | 12.93 |
| GEI + PCA [15] | 17.33 | 15.72 | 18.54 | 12.5 | 19.75 | 19.35 | 18.54 | 19.07 | 24.19 | 19.75 | 16.93 |
| GEI + LXP [16] | 7.33 | 9.05 | 7.33 | 12.07 | 12.07 | 6.47 | 9.48 | 9.48 | 13.79 | 7.33 | 6.9 |
| GEI + LBP [17] | 9.91 | 9.91 | 15.95 | 18.1 | 16.38 | 15.09 | 13.79 | 17.24 | 10.78 | 10.78 | 11.21 |
| GEI + SLBP [18] | 7.33 | 12.07 | 13.79 | 11.64 | 12.07 | 13.79 | 11.64 | 13.36 | 11.21 | 12.07 | 7.33 |
| GEI + FLBP | 11.33 | 16.5 | 17.62 | 20.64 | 20.36 | 21.07 | 16.5 | 18.52 | 14.81 | 13.91 | 13.9 |
| GEI + KFLBP | 13.36 | 20.26 | 20.26 | 24.57 | 26.29 | 25.43 | 20.69 | 19.4 | 18.1 | 15.95 | 15.52 |
| LGBP [7] | 22.85 | 24.86 | 27.59 | 27.16 | 31.47 | 29.74 | 31.47 | 23.71 | 24.14 | 17.24 | 22.85 |
| LGXP [8] | 16.13 | 17.74 | 16.94 | 16.94 | 18.95 | 20.56 | 15.73 | 15.73 | 16.94 | 15.32 | 20.56 |
| SLGBP | 16.13 | 15.32 | 12.9 | 16.53 | 11.69 | 8.06 | 10.48 | 14.92 | 12.9 | 13.71 | 20.97 |
| FLGBP | 38.79 | 32.33 | 34.68 | 41.81 | 44.4 | 41.81 | 40.95 | 45.26 | 42.67 | 30.6 | 32.76 |
| KFLGBP | 40.09 | 34.68 | 40.09 | 43.54 | 47.41 | 43.97 | 47.41 | 43.97 | 43.97 | 35.41 | 40.09 |

FIG. 9 is a block diagram illustrating an example computer system for performing the feature extraction and subject recognition method according to an exemplary aspect of the disclosure. The computer system 900 may include one or more main processors 950 and a graphics processing device 912. The graphics processing device 912 may perform many of the mathematical operations of the method. The computer system 900 includes main memory 902 that contains the software being executed by the processors 950 and 912, as well as a long term storage device 904 for storing data and the software programs. Several interfaces for interacting with the computer system 900 may be provided, including an I/O Bus Interface 910, Input/Peripherals 918 such as a keyboard, touch pad, mouse, camera, Display Interface 916 and one or more Displays 908, and a Network Controller 906 to enable wired or wireless communication through a network 99. The interfaces, memory and processors may communicate over the system bus 926, such as a PCI bus.

The invention claimed is:

1. A method of subject recognition by a classification model trained based on gait, performed by executing a program by one or more processors in a computer system, the method comprising:
  determining a set of feature vectors from a video sequence of a moving subject;
  training the classification model with the set of feature vectors; and
  classifying a new video sequence in order to recognize the subject,
  wherein the determining the set of feature vectors comprises:
  inputting, into the computer system, a video sequence of a moving subject;
  determining, by the one or more processors, an average image of images of the video sequence for a cycle;
  filtering, by the one or more processors, the averaged image to obtain N filtered responses, N is a natural number greater than one;
  determining, by the one or more processors, the magnitudes of the filtered responses for a center pixel pc and a selected plurality of neighbor pixels having a radius r;
  for each filtered response, determining for each of K different radiuses from the center pixel pc, by the one or more processors, a plurality of fuzzy based local patterns based on the magnitudes of the filtered responses, including applying a kernel fuzzy local binary pattern operator that sums magnitude differences of the filtered response for selected pixels at a respective same radius r from the center pixel pc, to generate the plurality of fuzzy-based local patterns for each of the respective K different radiuses, K is a natural number greater than one;
  for each filtered response, summing the fuzzy-based local patterns for each of the respective kernel fuzzy local binary pattern operators to form a histogram for a respective filtered response;
  forming, by the one or more processors, feature vectors based on the histograms of the N filtered responses.

2. The method of claim 1, wherein the video sequence of a moving subject is a sequence of a subject's gait.

3. The method of claim 1, wherein the cycle is determined as the distance between each pair of consecutive peaks,
  wherein peak locations are located by performing autocorrelation over a sequence of binary silhouettes calculated from the video sequence.

4. The method of claim 1, wherein the filtering is performed by convoluting the averaged image and a Gabor filter to obtain one or more Gabor-based gait representations.

5. The method of claim 1, wherein the forming feature vectors comprises:
  combining the fuzzy-based local patterns for each filtered response;
  for each filtered response, determining a pattern histogram from the combined patterns; and
  concatenating the histograms into a histogram containing the feature vectors.

6. The method of claim 1, wherein the determining for each of K different radiuses from the center pixel pc, by the one or more processors, the plurality of fuzzy-based local patterns is performed for at least two different radii r1 and r2 in accordance with k kernel fuzzy local binary pattern operators using $$KFLBP_{v,\mu}(p_{r_k}, r_k) = \sum_{n=0}^{p_{r_k}-1} s(Mag_{v,\mu}(p_n^{r_k}) - Mag_{v,\mu}(p_c))2^n$$

where $p_{r_k}$ is the number of neighbors at radius rk; $p_n^{r_k}$ is the $n^{th}$ neighbor pixel at radius rk; and $Mag_{v,\mu}(p_n^{r_k})$ denotes the magnitude of Gabor response with scale v and orientation $\mu$.

7. A computer system comprising one or more processors, the one or more processors executing a program to perform steps comprising:
  determining a set of feature vectors from a video sequence of a moving subject;
  training the classification model with the set of feature vectors; and
  classifying a new video sequence in order to recognize the subject,
  wherein the determining the set of feature vectors comprises:
  inputting to the computer system a video sequence of a moving subject;
  determining an average image of images of the video sequence for a cycle;
  filtering the averaged image to obtain N filtered responses, N is a natural number greater than one;
  determining the magnitudes of the filtered responses for a center pixel pc and a selected plurality of neighbor pixels having a radius r;
  for each filtered response, determining for each of K different radiuses from the center pixel pc a plurality of fuzzy-based local patterns based on the magnitudes of the filtered responses, including applying a kernel fuzzy local binary pattern operator that sums magnitude differences of the filtered response for selected pixels at a respective same radius r from the center pixel pc, to generate the plurality of fuzzy-based local patterns for each of the respective K different radiuses, K is a natural number greater than one;
  for each filtered response, summing the fuzzy-based local patterns for each of the respective kernel fuzzy local binary pattern operators to form a histogram for a respective filtered response;
  forming feature vectors based on the histograms of the N filtered responses.

8. The system of claim 7, wherein the video sequence of a moving subject is a sequence of a subject's gait.

9. The system of claim 7, wherein the cycle is determined as the distance between each pair of consecutive peaks,
  wherein peak locations are located by performing autocorrelation over a sequence of binary silhouettes calculated from the video sequence.

10. The system of claim 7, wherein the filtering is performed by convoluting the averaged image and a Gabor filter to obtain one or more Gabor-based gait representations.

11. The system of claim 7, wherein the forming feature vectors comprises:
  combining the fuzzy-based local patterns for each filtered response;
  for each filtered response, determining a pattern histogram from the combined patterns; and
  concatenating the histograms into a histogram containing the feature vectors.

* * * * *